United States Patent
Yashin et al.

(10) Patent No.: US 11,015,753 B2
(45) Date of Patent: May 25, 2021

(54) SYSTEM, METHOD AND APPARATUS FOR PULL-ACTUATED SPLINE FOR COUPLING WITH A PIPE

(71) Applicant: North American Pipe Corporation, Houston, TX (US)

(72) Inventors: Dmitry Yashin, Haverford, PA (US); Roy L. Dean, Schwenksville, PA (US); Joshua E. Clapper, Downington, PA (US)

(73) Assignee: NORTH AMERICAN PIPE CORPORATION, Houston, TX (US)

( * ) Notice: Subject to any disclaimer, the term of this patent is extended or adjusted under 35 U.S.C. 154(b) by 514 days.

(21) Appl. No.: 15/957,096

(22) Filed: Apr. 19, 2018

(65) Prior Publication Data

US 2018/0306359 A1    Oct. 25, 2018

Related U.S. Application Data

(60) Provisional application No. 62/487,713, filed on Apr. 20, 2017.

(51) Int. Cl.
| | | |
|---|---|---|
| *F16L 37/086* | (2006.01) | |
| *F16L 47/08* | (2006.01) | |
| *F16L 47/12* | (2006.01) | |
| *F16L 37/088* | (2006.01) | |
| *F16L 41/02* | (2006.01) | |

(52) U.S. Cl.
CPC ......... *F16L 37/086* (2013.01); *F16L 37/0885* (2019.08); *F16L 47/08* (2013.01); *F16L 47/12* (2013.01); *F16L 41/021* (2013.01)

(58) Field of Classification Search
CPC . F16L 37/086; F16L 37/0842; F16L 37/0885; F16L 37/1235; F16L 47/12; F16L 47/08
USPC ........................................... 285/33, 307, 403
See application file for complete search history.

(56) References Cited

U.S. PATENT DOCUMENTS

| | | | | |
|---|---|---|---|---|
| 3,744,824 A | * | 7/1973 | Roos ................... | F16L 37/0842 285/317 |
| 4,025,049 A | * | 5/1977 | Schmidt ................. | F16L 37/40 251/149.6 |

\* cited by examiner

*Primary Examiner* — Aaron M Dunwoody
(74) *Attorney, Agent, or Firm* — Lempia Summerfield Katz LLC

(57) ABSTRACT

A pipe system includes a tubular body having an axis, a bore extending in an axial direction, a tubular body retainer groove formed in the bore, and a tubular body exterior. Retainers are configured to be mounted in the tubular body retainer groove only from the bore of the tubular body. In one version, the retainers cannot be installed in the tubular body retainer groove from the exterior of the tubular body. The retainers are configured to be circumferentially spaced apart from each other with respect to the axis. In addition, a pipe having a pipe exterior with a pipe retainer groove is configured to receive the retainers to form a pipe assembly.

19 Claims, 13 Drawing Sheets

SYSTEM, METHOD AND APPARATUS FOR PULL-ACTUATED SPLINE FOR COUPLING WITH A PIPE

This application claims priority to and the benefit of U.S. Prov. App. No. 62/487,713, filed Apr. 20, 2017, which is incorporated herein by reference in its entirety.

BACKGROUND OF THE INVENTION

Field of the Disclosure

The present invention relates in general to pipes and, in particular, to a system, method and apparatus for a pull-actuated retainer for coupling with a pipe.

Description of the Prior Art

Conventional spline-type, restrained pipe joint systems typically have splines that are separate from the pipes and are installed at the job site. The splines can be lost during transportation or disassembly. Examples of such designs include those disclosed in U.S. Pat. Nos. 5,662,360, 7,284,310, and 7,537,248. There are no "push to lock" type pipe joints that rely on a spline that automatically "expands" to open, and then snaps into place to secure the joint. Some users would prefer a quicker installation of restrained joint pipe that eliminates handling the splines separately, and yet still provide a robust pipe joint system. Thus, improvements in pipe restrained joints continue to be of interest.

SUMMARY

Embodiments of a system, method and apparatus for a pull-actuated retainer for coupling with a pipe are disclosed. For example, a pipe system includes a tubular body having an axis, a bore extending in an axial direction, a tubular body retainer groove formed in the bore, and a tubular body exterior. Retainers are configured to be mounted in the tubular body retainer groove only from the bore of the tubular body. In one version, the retainers cannot be installed in the tubular body retainer groove from the exterior of the tubular body. The retainers are configured to be circumferentially spaced apart from each other with respect to the axis. In addition, a pipe having a pipe exterior with a pipe retainer groove is configured to receive the retainers to form a pipe assembly.

Another embodiment of a pipe system includes a tubular body having an axis, a bore extending in an axial direction, a tubular body retainer groove formed in the bore, and a tubular body exterior. A retainer is configured to be mounted in the tubular body retainer groove. The retainer is actuated to a disengaged configuration by only a radial force relative to the axis, such that the retainer is not actuated to the disengaged configuration by circumferential or tangential forces relative to the axis. The radial force is manually applied to the retainer external to the tubular body. A pipe having a pipe exterior with a pipe retainer groove is configured to receive the retainer to form a pipe assembly.

A third embodiment of a pipe system includes a tubular body having an axis, a bore extending in an axial direction, a tubular body retainer groove formed in the bore, and a tubular body exterior. A retainer is configured to be mounted in the tubular body retainer groove. The retainer includes a retainer body and a bias member for biasing the retainer body radially inward. The bias member extends from the retainer body in a generally circumferential direction with respect to the axis. A pipe having a pipe exterior with a pipe retainer groove is configured to receive the retainer to form a pipe assembly.

An embodiment of a method of assembling and disassembling a pipe system includes providing a tubular body having an interior with a tubular body retainer groove; installing a retainer in the tubular body retainer groove from the interior of the tubular body; inserting a pipe into the interior of the tubular body such that the retainer expands and then seats in a pipe retainer groove on an exterior of the pipe to form a pipe assembly; and to disassemble the pipe assembly, the method further comprises: manually actuating the retainer with radial force from an exterior of the tubular body, such that the retainer releases from the pipe and the pipe can be removed from the tubular body.

The foregoing and other objects and advantages of these embodiments will be apparent to those of ordinary skill in the art in view of the following detailed description, taken in conjunction with the appended claims and the accompanying drawings.

BRIEF DESCRIPTION OF THE DRAWINGS

So that the manner in which the features and advantages of the embodiments are attained and can be understood in more detail, a more particular description may be had by reference to the embodiments thereof that are illustrated in the appended drawings. However, the drawings illustrate only some embodiments and therefore are not to be considered limiting in scope as there may be other equally effective embodiments.

The use of the same reference symbols in different drawings indicates similar or identical items.

DETAILED DESCRIPTION

Figure 1:
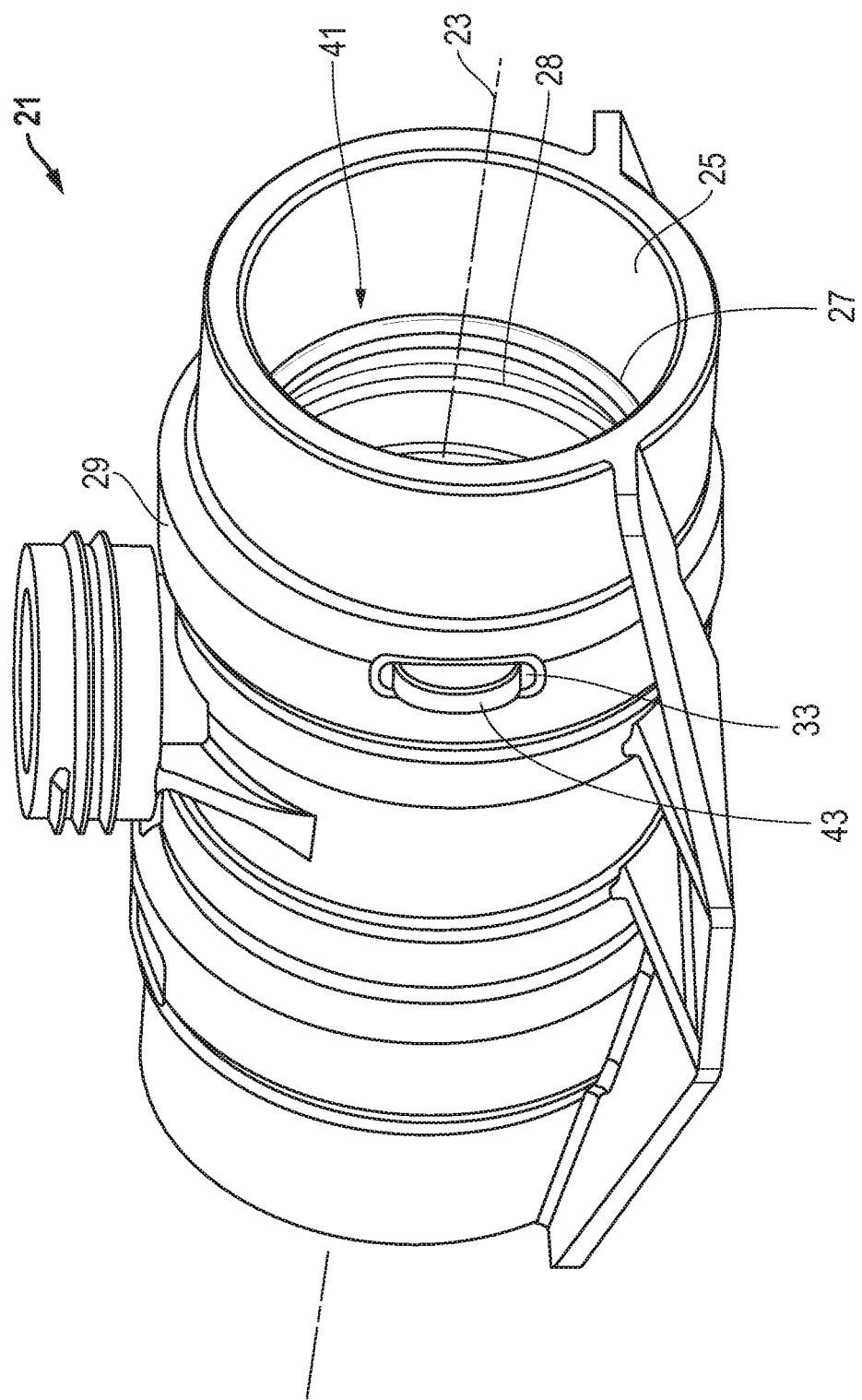
FIG. 1 is an isometric view of an embodiment of a coupling assembly.
Figure 2:
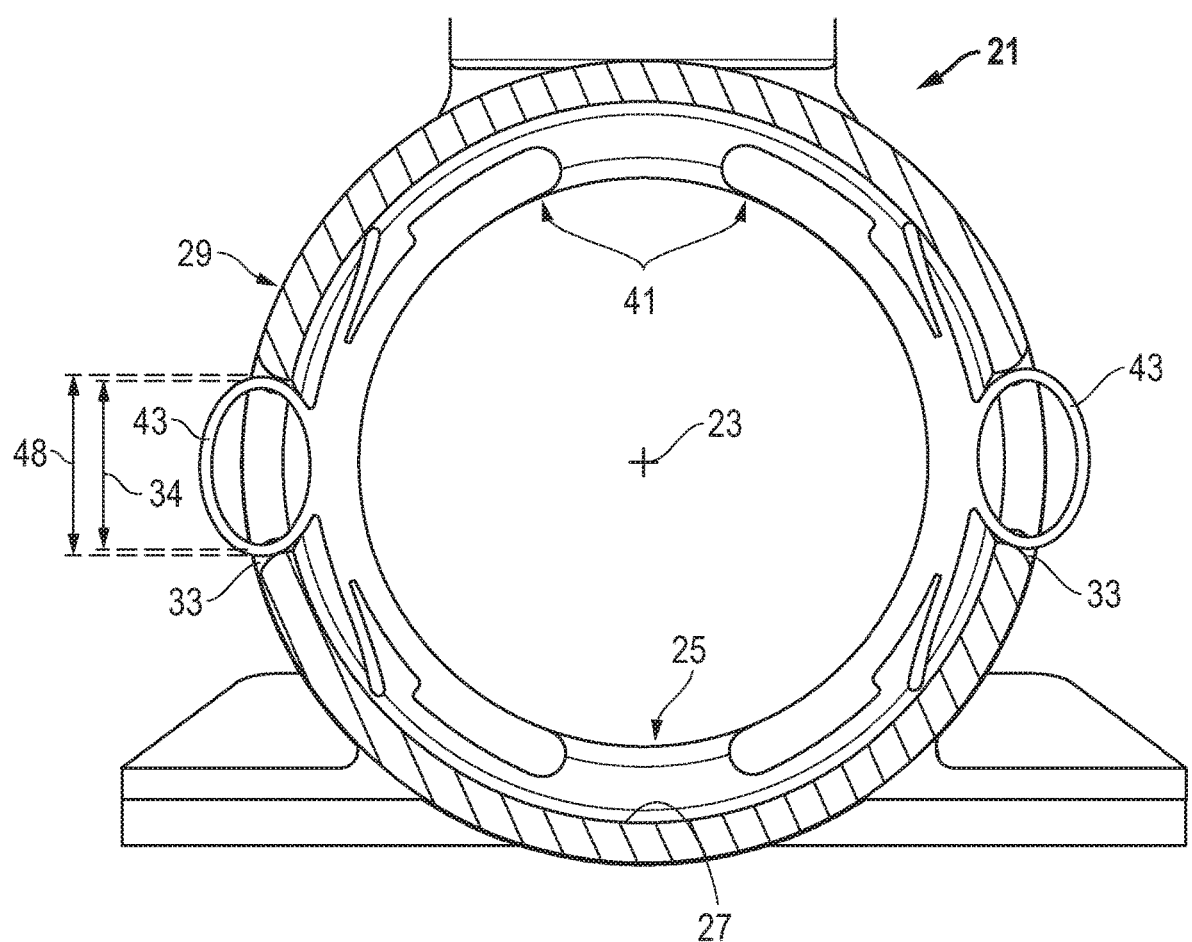
FIG. 2 is a sectional axial view of the embodiment of FIG. 1.

Embodiments of a system, method and apparatus for a pull-actuated retainer, such as a spline, for coupling with a pipe are disclosed. For example, FIGS. 1 and 2 depict a tubular body 21 having an axis 23, a bore 25 extending in an axial direction, a tubular body spline groove 27 formed in the bore 25, and a tubular body exterior 29. Although the tubular body 21 is depicted as a coupling, it also may comprise a pipe having a belled end (not shown) for receiving the spigot end of another pipe. Tubular body 21 may further comprise a seal groove 28 for a seal (not shown) for sealing the tubular body 21 to a pipe. In addition, the tubular body 21 may include one or more apertures 33 extending from the exterior 29 to the tubular body spline groove 27. In some embodiments, the aperture 33 can be generally elliptical in radial shape and generally conical in volume.

One or more splines 41 (e.g., two shown) may be configured to be mounted in the tubular body spline groove 27. The splines 41 can be identical to each other. In some embodiments, the splines 41 are mounted in the tubular body 21 only from the bore 25 of the tubular body 21. In such versions, the splines 41 cannot be installed in the tubular body spline groove 27 from the exterior 29 of the tubular body 21. The splines 41 may be configured to be circumferentially spaced apart from each other with respect to the axis 23. The splines 41 may be axially aligned and radially opposite each other, as shown. Examples of the spline 41 may include an angular span AS (FIG. 3) relative to the axis 23. For example, versions of the angular span AS can be in a range of about 90 degrees to about 170 degrees.

The spline 41 may include a handle 43 that extends from the tubular body spline groove 27 through a respective aperture 33 in the tubular body 21 to the exterior 29 of the tubular body 21. In the illustrated example, the handle 43 comprises an elliptical shape. The handle 43 may comprise a maximum dimension 48 (FIG. 2) that is greater than a maximum dimension 34 of the aperture 33. Versions of the handle 43 can be elastic and may be configured to elastically deform when installed through the aperture 33 in the tubular body 21 to permit installation of the spline 41 in the tubular body 21.

Figure 3:
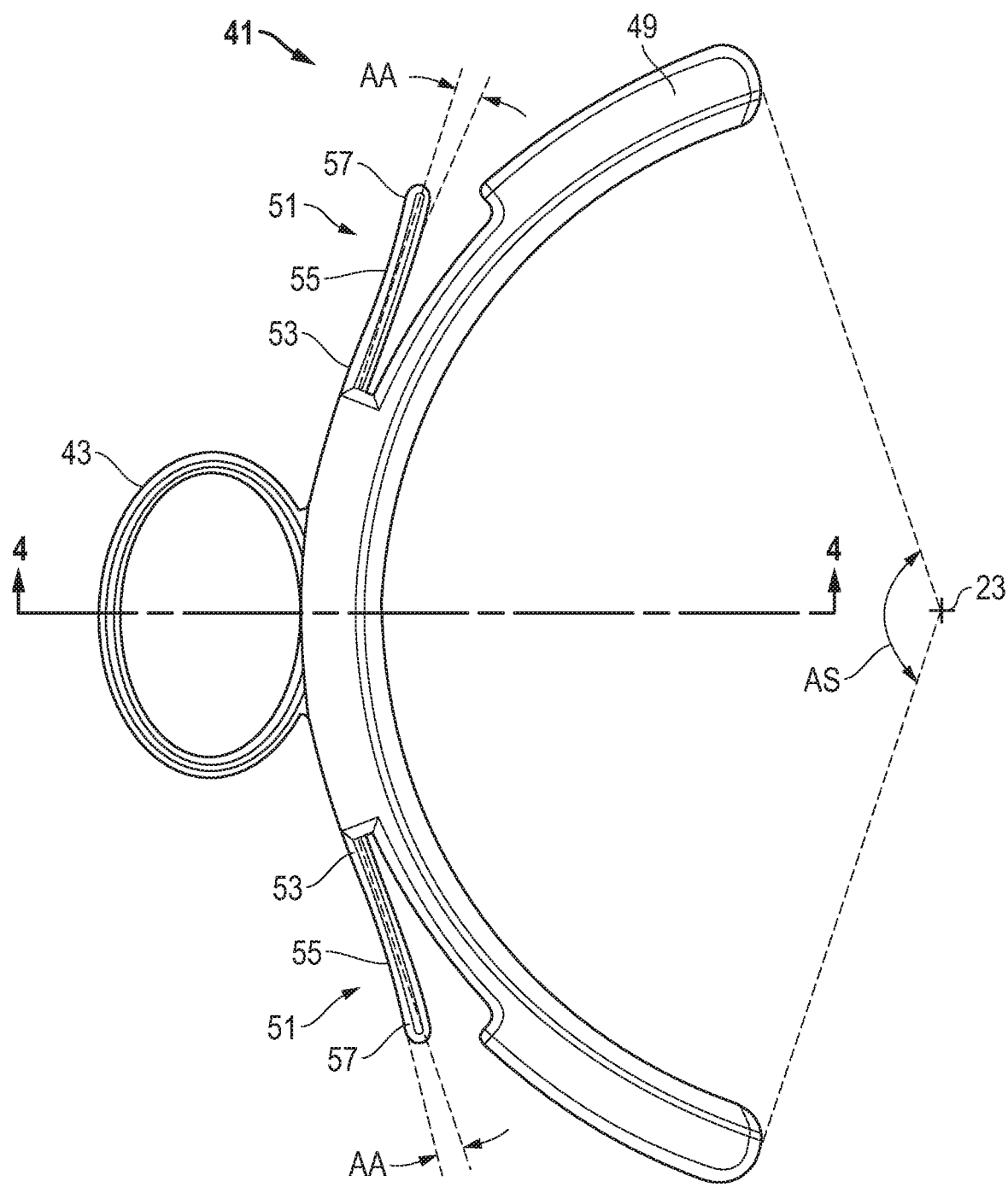
FIG. 3 is an axial view of an embodiment of a retainer.
Figure 4:
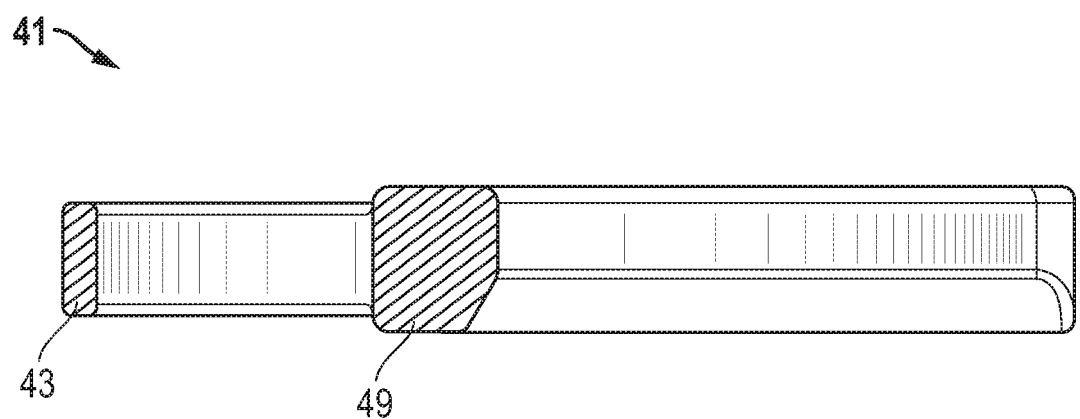
FIG. 4 is a sectional side view of an embodiment of the retainer of FIG. 3 taken along the line 4-4 of FIG. 3.

Embodiments of the spline 41 may include a spline body 49 (FIGS. 3 and 4). In some examples, the spline body 49 is not elastic and cannot elastically deform to be installed through the aperture 33 in the tubular body 21. The spline body 49 can be rigid and comprise a fixed, angular span AS in both engaged and disengaged configurations.

Other embodiments of the spline 41 can be configured to be biased radially inward relative to the axis 23. For example, the spline 41 may include the spline body 49 and one or more bias members 51 (e.g., two shown) for biasing the spline body 49 radially inward. In some examples, the bias member 51 comprises a finger. Versions of the finger may include a proximal end 53 extending in a substantially tangential direction from the spline body 49 of the spline 41. Embodiments of the finger can be canted 55 radially outward at a distal end 57 thereof relative to the proximal end 53. The distal end 57 of the finger may be canted at an acute angle AA relative to the proximal end 53. For example, the acute angle AA can be in a range of about 1 degree to about 20 degrees.

Figure 5:
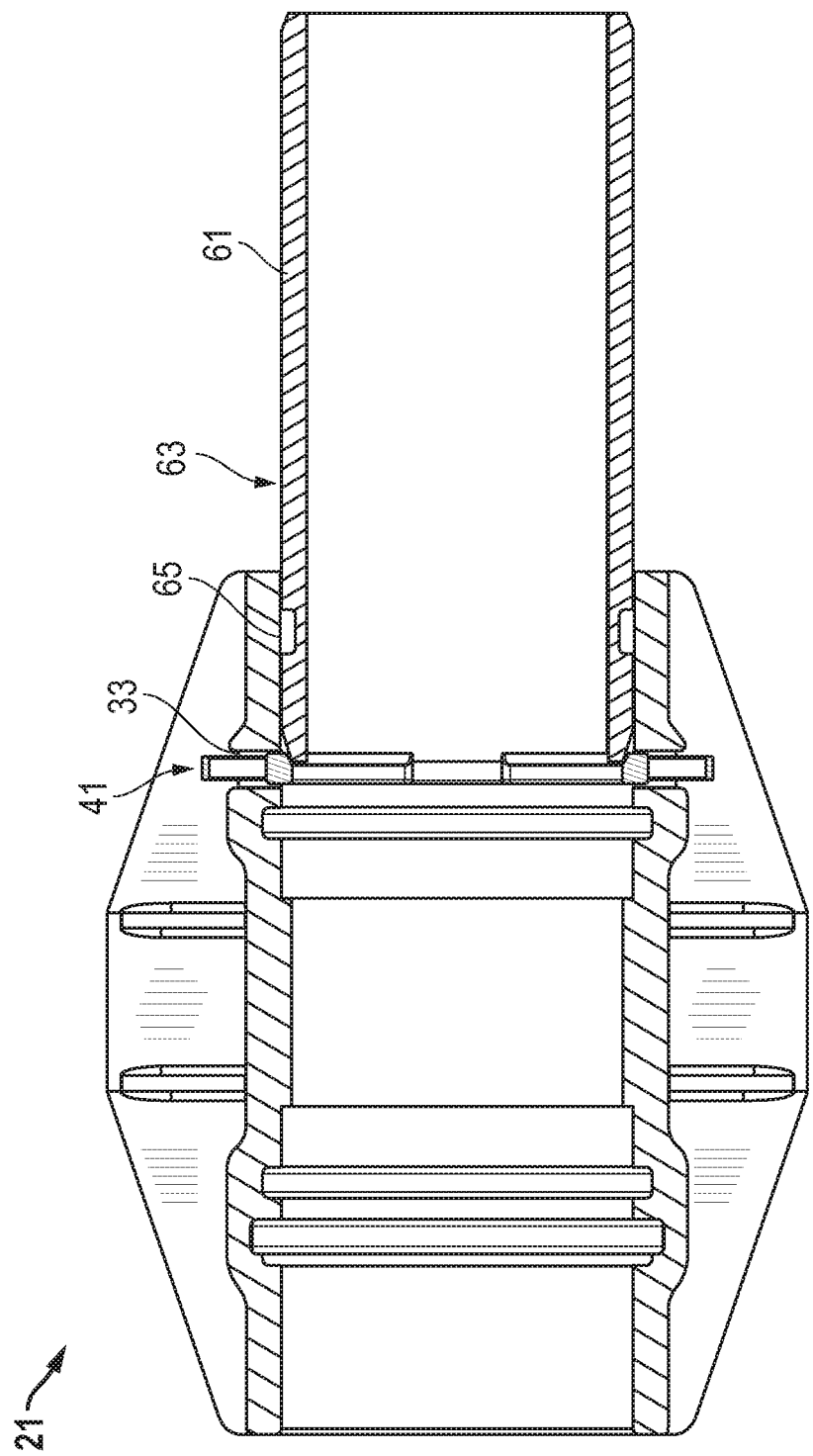
FIG. 5 is a sectional top view of an embodiment of an initial stage of forming a pipe assembly.
Figure 6:
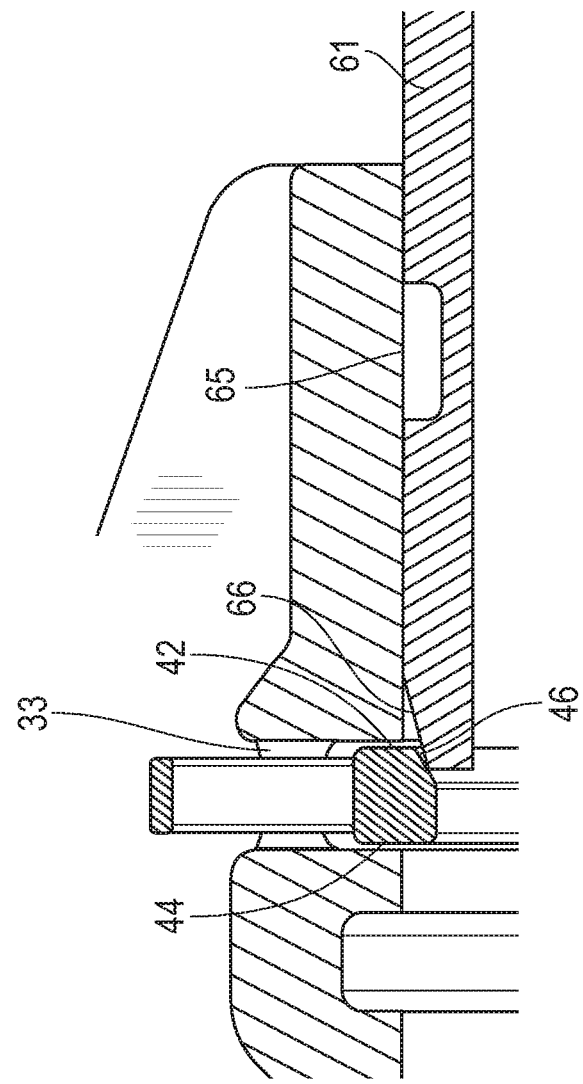
FIG. 6 is an enlarged sectional side view of a portion of the embodiment of FIG. 5.

FIGS. 5-11 depict various stages of engagement between tubular body 21, splines 41 and a pipe 61. Pipe 61 may include a pipe exterior 63 with a pipe spline groove 65 configured to receive the splines 41 to form a pipe assembly. FIGS. 5 and 6 depict an embodiment at an initial stage of forming a pipe assembly. In some embodiments, each spline 41 comprises an axial leading edge 42 (FIG. 6) and an axial trailing edge 44. Versions of the axial leading edge 42 can be chamfered 46 to facilitate initial engagement with the pipe 61 and initial radial motion of the spline 41. In addition, the leading edge of pipe 61 also may be chamfered 66 to facilitate or even further enhance the initial entry and initial engagement process.

Figure 7:
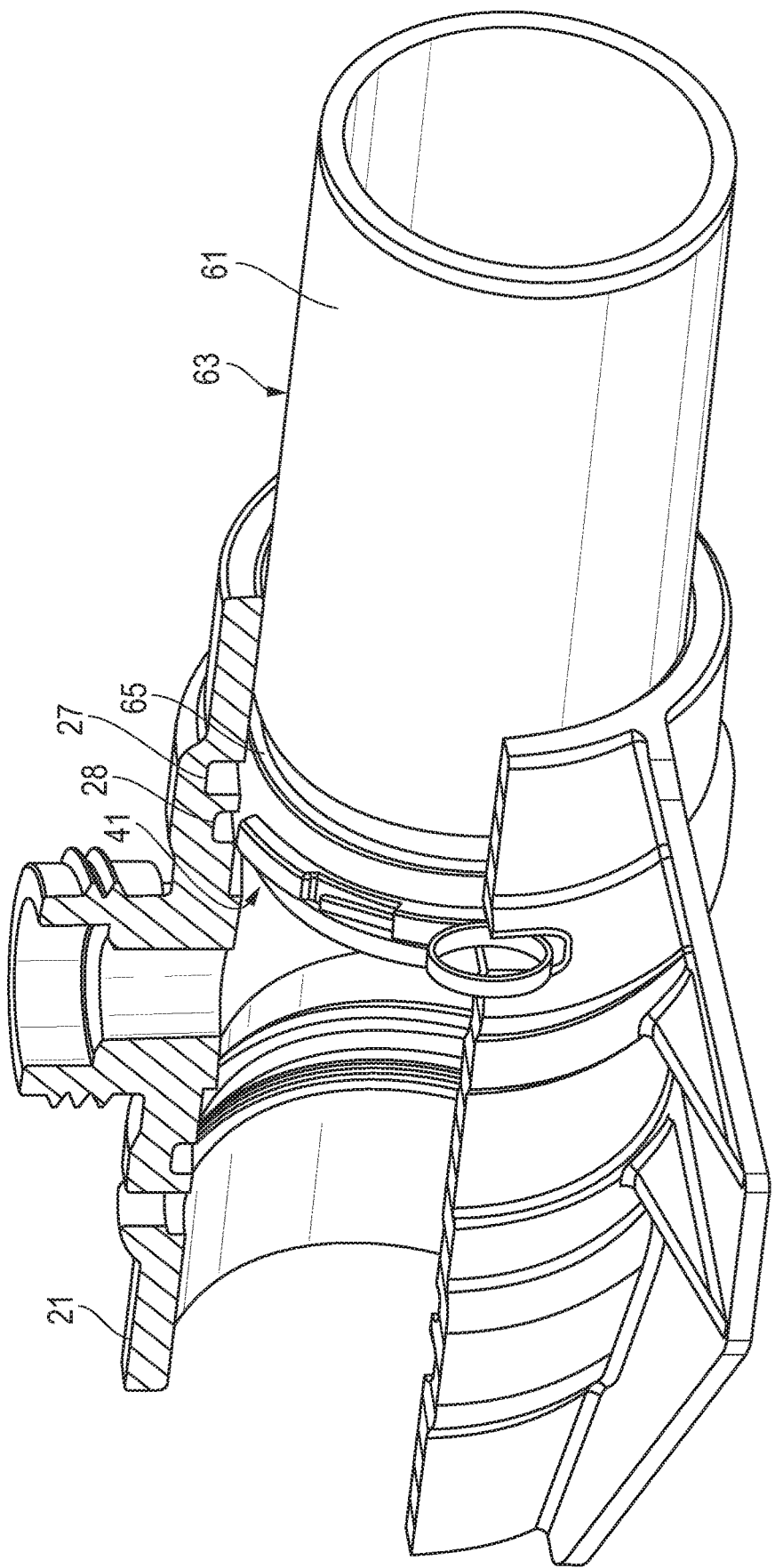
FIG. 7 is a partially-sectioned, isometric view of an embodiment of an intermediate stage of forming a pipe assembly.
Figure 8:
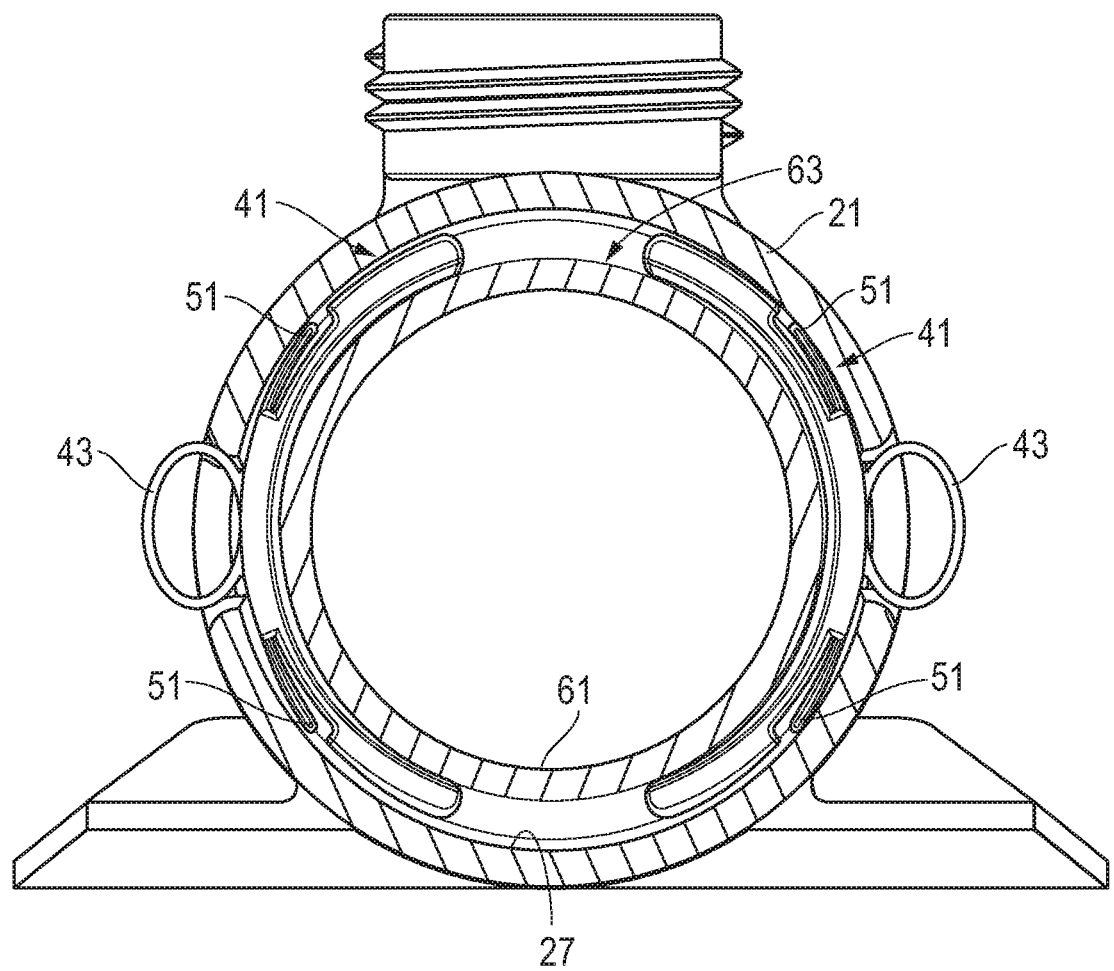
FIG. 8 is a sectional axial view of the embodiment of FIG. 7.
Figure 9:
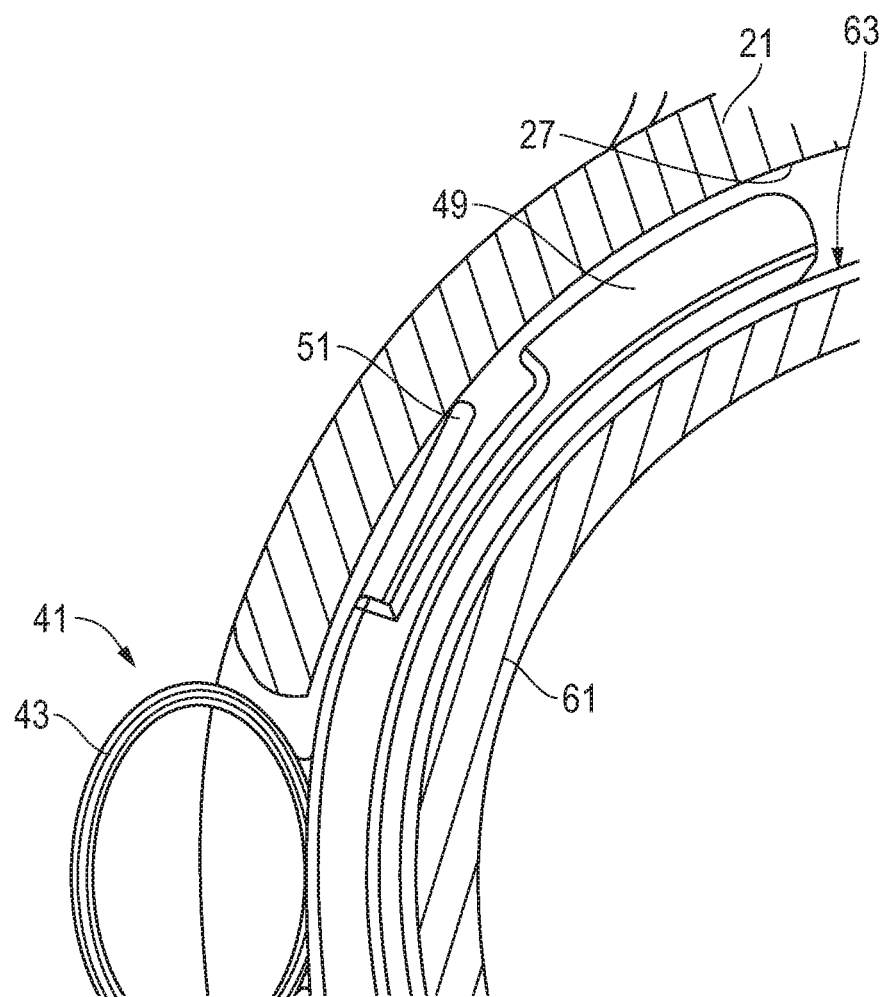
FIG. 9 is an enlarged sectional axial view of a portion of the embodiment of FIG. 8.

FIGS. 7-9 depict an embodiment of an intermediate stage of forming the pipe assembly. At this stage the pipe 61 is sliding through the splines 41. The pipe 61 has expanded the splines 41 radially outward into the tubular body spline groove 27, such that the bias members 51 are partially collapsed, but continue to bias the splines 41 radially inward against the outer surface 63 of the pipe 61. The splines 41 have not yet seated in the pipe spline groove 65.

Figure 10:
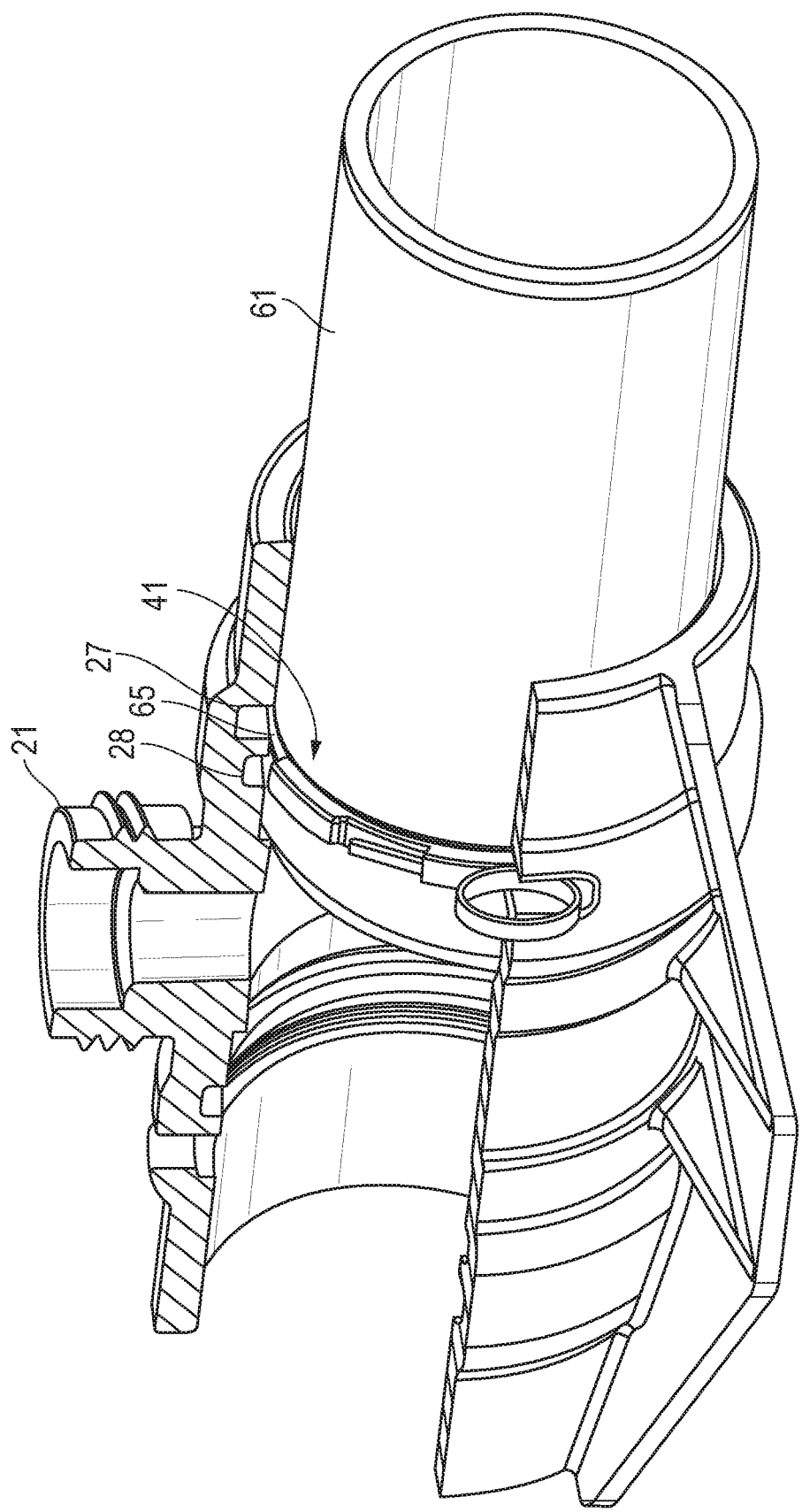
FIG. 10 is a partially-sectioned, isometric view of an embodiment of a final stage of forming a pipe assembly.
Figure 11:
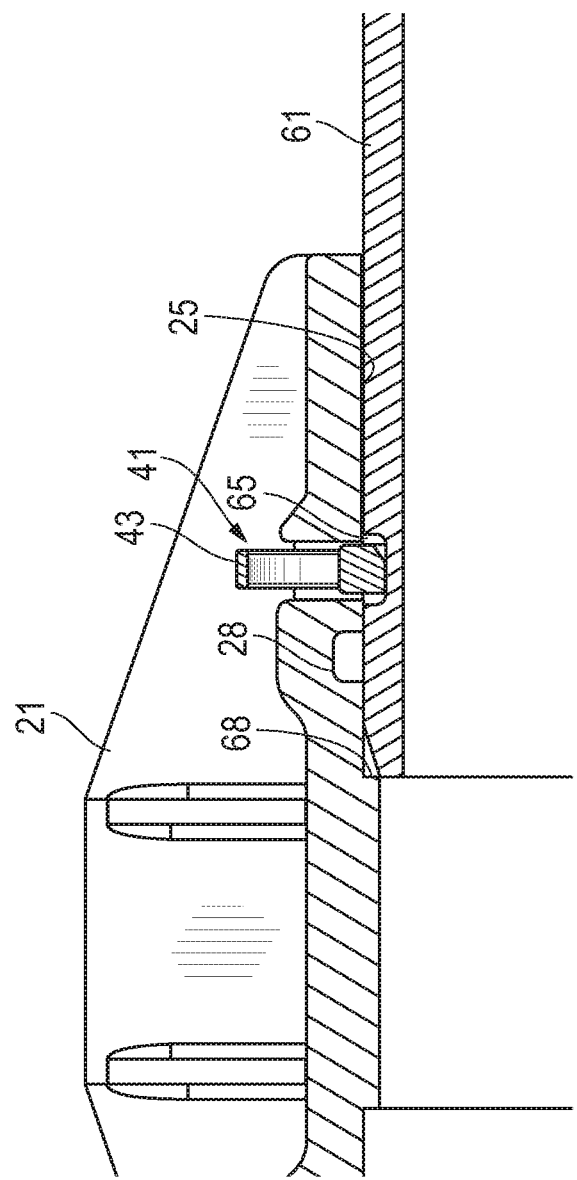
FIG. 11 is a partial sectional top view of a portion of the embodiment of FIG. 10.

FIGS. 10 and 11 depict an embodiment of a final stage of forming the pipe assembly. At this stage, the axial travel of the pipe 61 can be limited by a shoulder 68 (FIG. 11) in the bore 25 of the tubular body 21. The splines 41 also seat in the pipe spline groove 65 as well as remain in the tubular body spline groove 27. The bias members 51 can bias the splines 41 radially inward into the pipe spline groove 65.

Embodiments of the splines 41 may be configured to not make physical contact with each other in both engaged configuration (FIGS. 10-11) and the disengaged configurations (FIGS. 1, 2, 5, 6 and 7-9) with respect to the pipe 61. The splines 41 can be configured to remain inside the tubular body 21 in both the engaged and disengaged configurations with respect to the pipe 61.

Figure 12:
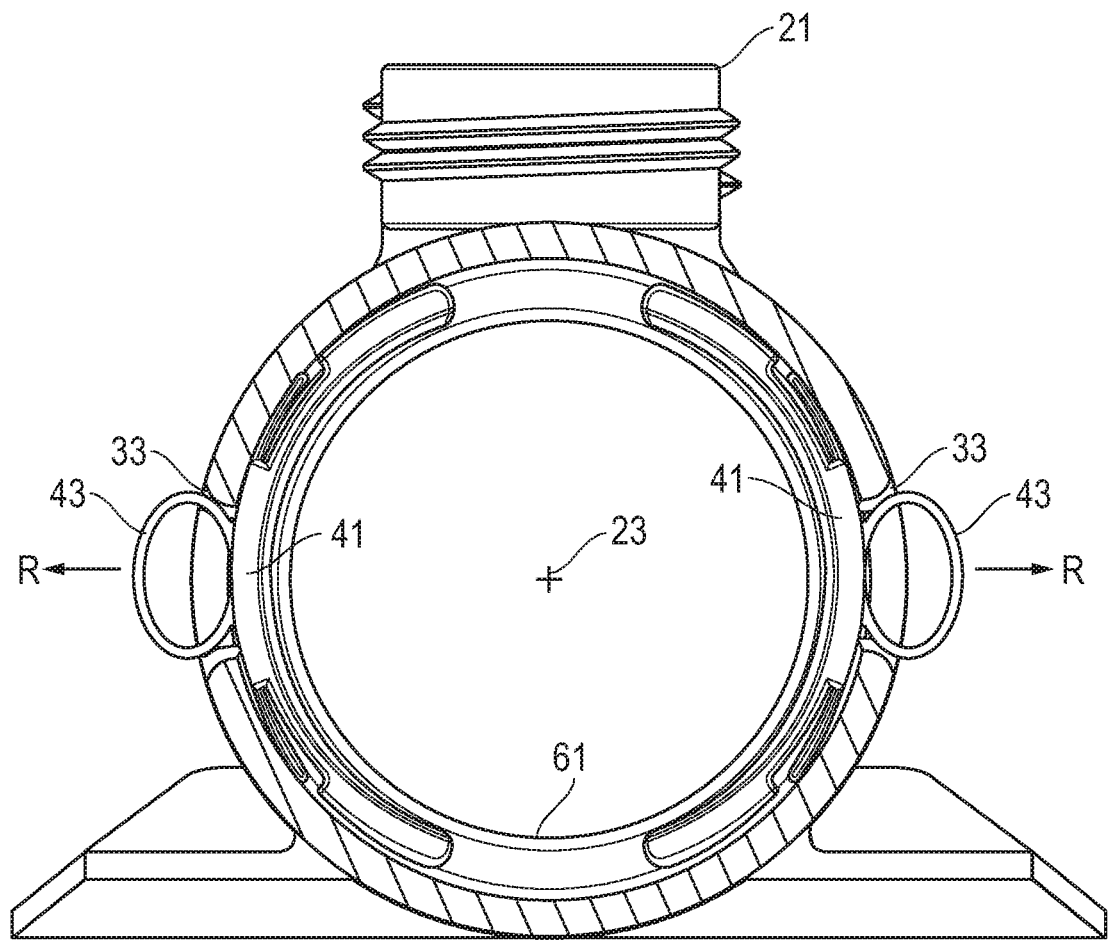
FIG. 12 is a sectional axial view of an embodiment of a coupling and retainer with the retainer moved to a disengaged position.
Figure 13:
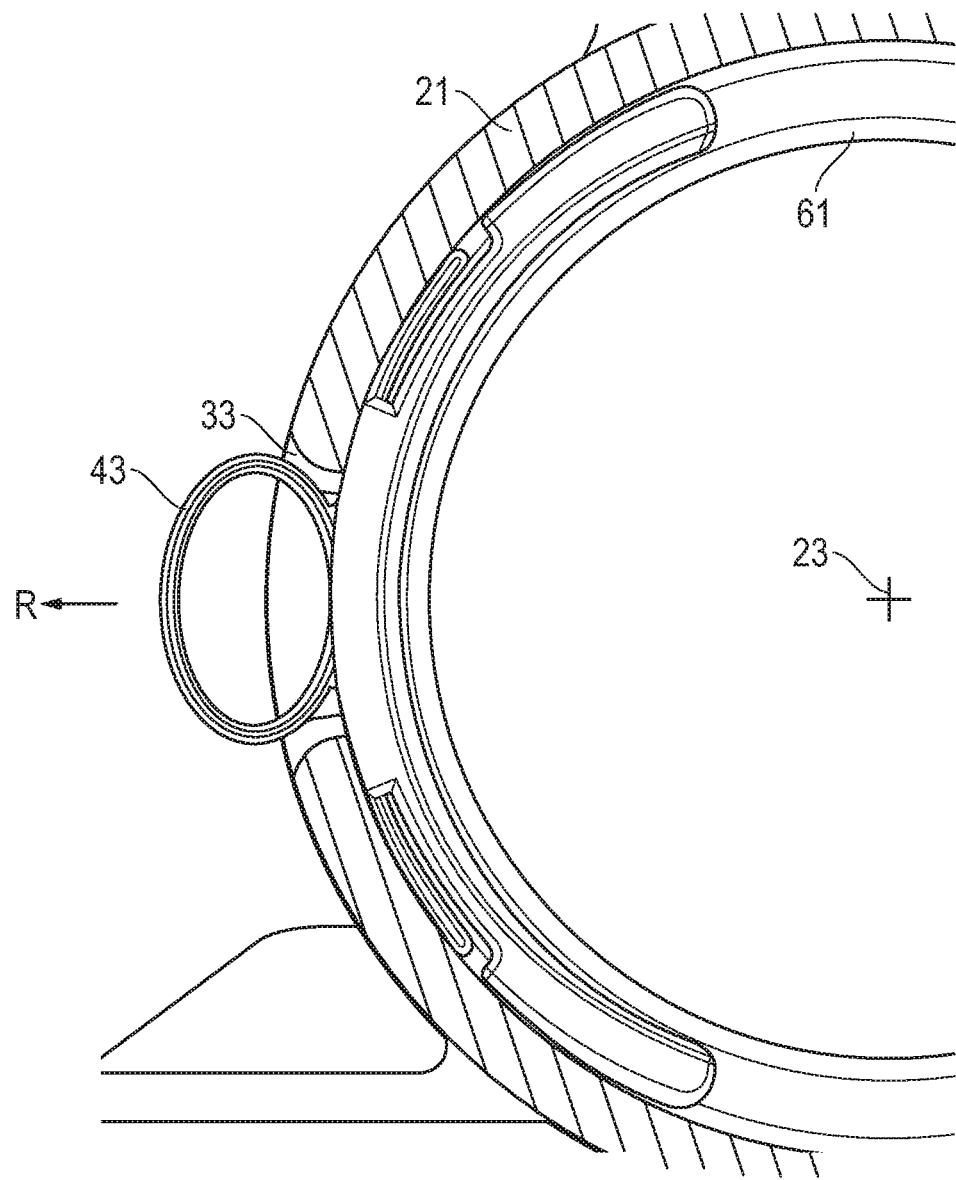
FIG. 13 is an enlarged sectional axial view of a portion of the embodiment of FIG. 12.

As shown in FIGS. 12 and 13, each spline 41 may be actuated to a disengaged configuration (i.e., to release the pipe 61 from the tubular body 21) by a radial force R relative to the axis 23. In some embodiments, only a radial force R can actuate splines 41 to the disengaged configuration, such that the splines 41 are not actuated to the disengaged configuration by circumferential or tangential forces applied to them relative to the axis 23. The radial force R may be manually applied to the splines 41 (e.g., via handles 43) external to the tubular body 21, as shown. In addition, the handle 43 may be configured to retain the spline 41 in the tubular body spline groove 27 prior to installation of the pipe 61 in the tubular body 21. The handle 43 can engage the aperture 33 through interference fit to prevent the handle 43 from falling through the aperture 33 into the tubular body 21 when the tubular body 21 is not engaged with the pipe 61.

Embodiments of a method of assembling and disassembling a pipe system also are disclosed. For example, the method may include providing a tubular body 21 having an interior 25 with a tubular body spline groove 27; installing a spline 41 in the tubular body spline groove 27 from the interior 25 of the tubular body 21; inserting a pipe 61 into the interior 25 of the tubular body 21 such that the spline 41 expands and then seats in a pipe spline groove 65 on an exterior 63 of the pipe 61 to form a pipe assembly; and to disassemble the pipe assembly, the method further comprises manually actuating the spline 41 with radial force R from an exterior of the tubular body 21, such that the spline 41 releases from the pipe 61 and the pipe 61 can be removed from the tubular body 21.

Other versions may include one or more of the following embodiments:

Embodiment 1

A pipe system, comprising:
a tubular body having an axis, a bore extending in an axial direction, a tubular body retainer groove formed in the bore, and a tubular body exterior;
retainers configured to be mounted in the tubular body retainer groove only from the bore of the tubular body, such that the retainers cannot be installed in the tubular body retainer groove from the exterior of the tubular body, and the retainers are configured to be circumferentially spaced apart from each other with respect to the axis; and a pipe having a pipe exterior with a pipe retainer groove configured to receive the retainers to form a pipe assembly.

Embodiment 2

The pipe system of any of these embodiments, wherein the retainers are configured to not make physical contact in both engaged and disengaged configurations with respect to the pipe.

Embodiment 3

The pipe system of any of these embodiments, wherein the retainers remain inside the tubular body in both engaged and disengaged configurations with respect to the pipe.

Embodiment 4

The pipe system of any of these embodiments, wherein each retainer is actuated to a disengaged configuration by only a radial force relative to the axis, such that the retainers are not actuated to the disengaged configuration by circumferential or tangential forces relative to the axis, and the radial force is manually applied to the retainers external to the tubular body.

Embodiment 5

The pipe system of any of these embodiments, wherein the retainers are identical to each other.

Embodiment 6

The pipe system of any of these embodiments, wherein each retainer comprises an angular span relative to the axis, and the angular span is in a range of about 90 degrees to about 170 degrees.

Embodiment 7

The pipe system of any of these embodiments, wherein the retainers are axially aligned and radially opposite each other.

Embodiment 8

The pipe system of any of these embodiments, wherein each retainer comprises a handle that extends from the tubular body retainer groove through a respective aperture in the tubular body to an exterior of the tubular body.

Embodiment 9

The pipe system of any of these embodiments, wherein the handle comprises a maximum dimension that is greater than a maximum dimension of the aperture.

Embodiment 10

The pipe system of any of these embodiments, wherein the handle is elastic and is configured to elastically deform when installed through the aperture in the tubular body to permit installation of the retainer in the tubular body.

Embodiment 11

The pipe system of any of these embodiments, wherein the retainer comprises a retainer body that is not elastic and cannot elastically deform to be installed through the aperture in the tubular body.

Embodiment 12

The pipe system of any of these embodiments, wherein the retainer body is rigid and comprises a fixed, angular span in both engaged and disengaged configurations with respect to the pipe.

Embodiment 13

The pipe system of any of these embodiments, wherein the handle is configured to retain the retainer in the tubular body retainer groove prior to installation of the pipe in the tubular body, and the handle engages the aperture through interference fit to prevent the handle from falling through the aperture into the tubular body when the tubular body is not engaged with the pipe.

Embodiment 14

The pipe system of any of these embodiments, wherein the handle comprises an elliptical shape.

Embodiment 15

The pipe system of any of these embodiments, wherein each retainer is configured to be biased radially inward relative to the axis.

Embodiment 16

The pipe system of any of these embodiments, wherein each retainer comprises a retainer body and a bias member for biasing the retainer body radially inward.

Embodiment 17

The pipe system of any of these embodiments, wherein the bias member comprises a pair of bias members extending in substantially opposite directions.

Embodiment 18

The pipe system of any of these embodiments, wherein the bias member comprises a finger having a proximal end extending in a substantially tangential direction from the retainer body of the retainer.

Embodiment 19

The pipe system of any of these embodiments, wherein the finger is canted radially outward at a distal end thereof relative to the proximal end.

Embodiment 20

The pipe system of any of these embodiments, wherein the distal end of the finger is canted at an acute angle relative to the proximal end, and the acute angle is in a range of about 1 degree to about 20 degrees.

Embodiment 21

The pipe system of any of these embodiments, wherein the finger is configured to move relative to a recess on an exterior of the retainer body as the retainer moves between an engaged position and a disengaged position with respect to the pipe.

Embodiment 22

The pipe system of any of these embodiments, wherein each retainer comprises an axial leading edge and an axial trailing edge, and the axial leading edge is chamfered to facilitate initial engagement with the pipe and initial radial motion of the retainer.

Embodiment 23

The pipe system of any of these embodiments, wherein the tubular body is one of a coupling and an integrated bell pipe.

Embodiment 24

The pipe system of any of these embodiments, wherein the tubular body comprises an aperture extending from the exterior to the tubular body retainer groove.

Embodiment 25

The pipe system of any of these embodiments, wherein the aperture is generally elliptical in radial shape and generally conical in volume.

Embodiment 26

A pipe system, comprising:
a tubular body having an axis, a bore extending in an axial direction, a tubular body retainer groove formed in the bore, and a tubular body exterior;
a retainer configured to be mounted in the tubular body retainer groove, the retainer is actuated to a disengaged configuration by only a radial force relative to the axis, such that the retainer is not actuated to the disengaged configuration by circumferential or tangential forces relative to the axis, and the radial force is manually applied to the retainer external to the tubular body; and
a pipe having a pipe exterior with a pipe retainer groove configured to receive the retainer to form a pipe assembly.

Embodiment 27

A pipe system, comprising:
a tubular body having an axis, a bore extending in an axial direction, a tubular body retainer groove formed in the bore, and a tubular body exterior;
a retainer configured to be mounted in the tubular body retainer groove, the retainer comprises a retainer body and a bias member for biasing the retainer body radially inward, and the bias member extends from the retainer body in a generally circumferential direction with respect to the axis; and
a pipe having a pipe exterior with a pipe retainer groove configured to receive the retainer to form a pipe assembly.

Embodiment 28

A method of assembling and disassembling a pipe system, the method comprising:
(a) providing a tubular body having an interior with a tubular body retainer groove;

(b) installing a retainer in the tubular body retainer groove from the interior of the tubular body;
(c) inserting a pipe into the interior of the tubular body such that the retainer expands and then seats in a pipe retainer groove on an exterior of the pipe to form a pipe assembly; and to disassemble the pipe assembly, the method further comprises:
(d) manually actuating the retainer with radial force from an exterior of the tubular body, such that the retainer releases from the pipe and the pipe can be removed from the tubular body.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

It may be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A pipe system, comprising:
   a tubular body having an axis, a bore extending in an axial direction, a tubular body retainer groove formed in the bore, and a tubular body exterior;
   retainers configured to be mounted in the tubular body retainer groove only from the bore of the tubular body, such that the retainers cannot be installed in the tubular body retainer groove from the exterior of the tubular body, and the retainers are configured to be circumferentially spaced apart from each other with respect to the axis; and
   a pipe having a pipe exterior with a pipe retainer groove configured to receive the retainers to form a pipe assembly,
   wherein each retainer comprises a handle that extends from the tubular body retainer groove through a respective aperture in the tubular body to an exterior of the tubular body.

2. The pipe system of claim 1, wherein the retainers are configured to not make physical contact with each other in both engaged and disengaged configurations with respect to the pipe.

3. The pipe system of claim 1, wherein the retainers remain inside the tubular body in both engaged and disengaged configurations with respect to the pipe.

4. The pipe system of claim 1, wherein each retainer is actuated to a disengaged configuration by only a radial force relative to the axis, such that the retainers are not actuated to the disengaged configuration by circumferential or tangential forces relative to the axis, and the radial force is manually applied to the retainers external to the tubular body.

5. The pipe system of claim 1, wherein the retainers are identical to each other.

6. The pipe system of claim 1, wherein each retainer comprises an angular span relative to the axis, and the angular span is in a range of about 90 degrees to about 170 degrees.

7. The pipe system of claim 1, wherein the retainers are axially aligned and radially opposite each other.

8. The pipe system of claim 1, wherein the handle comprises a maximum dimension that is greater than a maximum dimension of the aperture.

9. The pipe system of claim 1, wherein the handle is elastic and is configured to elastically deform when installed through the aperture in the tubular body to permit installation of the retainer in the tubular body.

10. The pipe system of claim 1, wherein the retainer comprises a retainer body that is not elastic and cannot elastically deform to be installed through the aperture in the tubular body, and the retainer body is rigid and comprises a fixed, angular span in both engaged and disengaged configurations with respect to the pipe.

11. The pipe system of claim 1, wherein the handle is configured to retain the retainer in the tubular body retainer groove prior to installation of the pipe in the tubular body, and the handle engages the aperture through interference fit to prevent the handle from falling through the aperture into the tubular body when the tubular body is not engaged with the pipe.

12. The pipe system of claim 1, wherein the handle comprises an elliptical shape.

13. The pipe system of claim 1, wherein each retainer is configured to be biased radially inward relative to the axis.

14. The pipe system of claim 1, wherein each retainer comprises an axial leading edge and an axial trailing edge, and the axial leading edge is chamfered to facilitate initial engagement with the pipe and initial radial motion of the retainer.

15. A pipe system, comprising:
    a tubular body having an axis, a bore extending in an axial direction, a tubular body retainer groove formed in the bore, and a tubular body exterior;
    retainers configured to be mounted in the tubular body retainer groove only from the bore of the tubular body, such that the retainers cannot be installed in the tubular body retainer groove from the exterior of the tubular body, and the retainers are configured to be circumferentially spaced apart from each other with respect to the axis; and
    a pipe having a pipe exterior with a pipe retainer groove configured to receive the retainers to form a pipe assembly,
    wherein each retainer comprises a retainer body and a bias member for biasing the retainer body radially inward, the bias member comprises a pair of bias members extending in substantially opposite directions, and the bias member comprises a finger having a proximal end extending in a substantially tangential direction from the retainer body of the retainer.

16. The pipe system of claim 15, wherein the finger is canted radially outward at a distal end thereof relative to the proximal end, the distal end of the finger is canted at an acute angle relative to the proximal end, and the acute angle is in a range of about 1 degree to about 20 degrees.

17. The pipe system of claim 15, wherein the finger is configured to move relative to a recess on an exterior of the retainer body as the retainer moves between an engaged position and a disengaged position with respect to the pipe.

18. A pipe system, comprising:
    a tubular body having an axis, a bore extending in an axial direction, a tubular body retainer groove formed in the bore, and a tubular body exterior;
    retainers configured to be mounted in the tubular body retainer groove only from the bore of the tubular body, such that the retainers cannot be installed in the tubular body retainer groove from the exterior of the tubular body, and the retainers are configured to be circumferentially spaced apart from each other with respect to the axis; and a pipe having a pipe exterior with a pipe retainer groove configured to receive the retainers to form a pipe assembly, wherein the tubular body comprises an aperture extending from the exterior to the tubular body retainer groove, the aperture is generally elliptical in radial shape and generally conical in volume, and the tubular body is one of a coupling and an integrated bell pipe.

19. A pipe system, comprising:

a tubular body having an axis, a bore extending in an axial direction, a tubular body retainer groove formed in the bore, and a tubular body exterior;

a retainer configured to be mounted in the tubular body retainer groove, the retainer comprises a retainer body and a bias member for biasing the retainer body radially inward, the bias member extends from the retainer body in a generally circumferential direction with respect to the axis;

the retainer is configured to be actuated to a disengaged configuration by a radial force relative to the axis, and the radial force is manually applied to the retainer external to the tubular body; and a pipe having a pipe exterior with a pipe retainer groove configured to receive the retainer to form a pipe assembly, wherein the bias member comprises a pair of fingers extending in substantially opposite directions, and the pair of fingers each having a proximal end coupled to and extending in a substantially tangential direction from the retainer body of the retainer.

* * * * *